Jan. 10, 1928.
R. P. NIXON
CAP SHAPE RETAINER
Filed Oct. 22, 1926
1,656,073
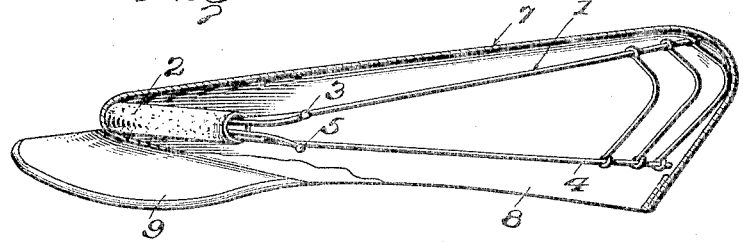
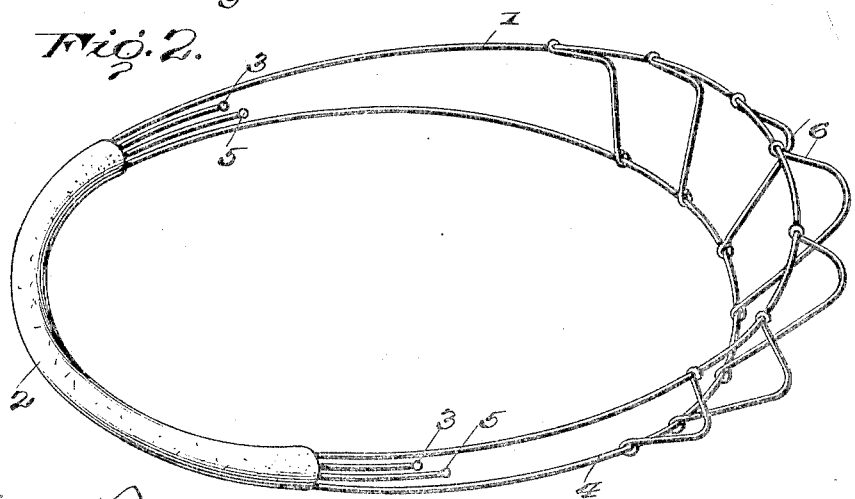
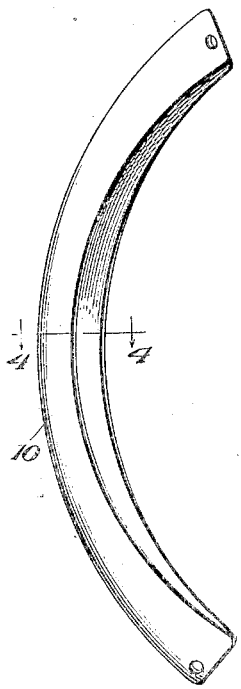
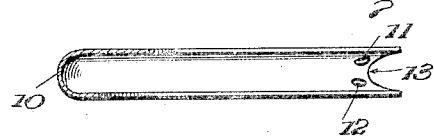
INVENTOR
R. P. Nixon
BY
ATTORNEYS Patented Jan. 10, 1928.

1,656,073

UNITED STATES PATENT OFFICE.

ROBERT P. NIXON, OF FOREST GROVE, OREGON.

CAP SHAPE RETAINER.

Application filed October 22, 1926. Serial No. 143,418.

My invention relates to improvements in cap shape retainers, and it consists in the combinations, constructions and arrangements herein described and claimed.

An object of the invention is the provision of a cap shape retainer which is adapted to be placed in the crown of a cap of any one of a plurality of different sizes and which then will be automatically adjusted as to size to fit snugly within the crown of the particular cap in which it has been placed so as to maintain the crown of the cap in proper distended form.

A further object of the invention is the provision of a cap shape retainer which will be reliable in use, not likely to get out of order easily, and thoroughly practical commercially.

Other objects and advantages of the invention will be apparent from the following description, considered in conjunction with the accompanying drawings, in which Figure 1 is a view showing the retainer embodying the invention in place in the crown of a cap, the crown of the cap being shown in longitudinal section and the remainder of the cap and the retainer being shown in side elevation, Figure 2 is a perspective view of the retainer alone, Figure 3 is a bottom plan view of a modified form of front connecting and supporting member which is adapted to be used in the retainer in lieu of the tubular member shown in Figures 1 and 2, and Figure 4 is a section substantially along the line 4—4 of Figure 3.

A practical embodiment of the invention as illustrated in Figures 1 and 2 may be termed a frame which is substantially circular in configuration and is radially expansible and contractile. This frame comprises an upper frame member 1 which is flexible and resilient and may be a wire bent substantially to circular form as shown, the circular form of the member being maintained by reason of the engagement of the end portions of the member 1 with a tubular connecting member 2 into which or through which the end portions of the member 1 are projected and with which the end portions of the member 1 frictionally contact. The connecting member 2 may be a length of flexible rubber tubing or like material which will conform to the shape of the portions of the member 1 which are projected therethrough from opposite ends of the tubular members 2 and the extremities of the member 1 may be enlarged and rounded as indicated at 3 so that they can be conveniently threaded or projected through the tubular member 2. The aforesaid frame also comprises a lower frame member 4 which is similar to the member 1 and may be a length of spring wire bent to a circular form and maintained in such form by the engagement of the end portions thereof with the tubular member 2, the end portions of the member 4 being projected into or through the tubular member 2 from opposite ends of the latter. The end portions of the member 4 may have their extremities enlarged and rounded at 5 to be similar to the enlarged rounded end portions 3 of the member 1.

The lapped end portions of the member 1 will be maintained close to each other and close to the lapped end portions of the member 4 by the tubular member 2 which will be maintained in arcuate form in longitudinal curvature by reason of the engagement of the end portions of the members 1 and 4 therewith.

The portions of the members 1 and 4 which are opposite the connecting member 2 are connected and maintained in spaced relation by a plurality of bendable connecting wires 6, any suitable number of which may be provided. The connecting wires 6 are considerably longer than the diameter of the tubular member 2 when the device is intended to be disposed in the crown 7 of a cap having the shape shown in Figure 1. These connecting wires 6 curve outwardly substantially along arcs of circles between the portions of the members 1 and 4 which are connected by the wires 6. The wires 6 are sufficiently stiff to maintain the portions of the members 1 and 4 which they connect in any adjusted spaced relation but the wires 6 can be bent to vary the distance between the portions of the members 1 and 4 which they connect and to vary the shape of the members 6 and the extent of outward protrusion of the curved portions of the members 6 beyond the associated portions of the members 1 and 4.

From the foregoing description of the various parts of the device, the operation thereof may be readily understood. The device may be contracted radially by forcing the end portions of the members 1 and 4 through the tubular member 2 until the device is sufficiently small to be inserted easily in the crown of the cap with which it is to be used, substantially to the position shown in Figure 1. The lower frame member 4 fits within the crown of the cap just above the upper edge of the usual sweat band 8 and the tubular connecting member 2 fits in the front portion of the crown of the cap above the visor 9 and maintains the front portion of the crown of the cap in its proper rounded shape. The members 1 and 4 will automatically expand because of the tendency of these members to straighten themselves so that the frame will fit snugly in the crown of the cap and will maintain the crown of the cap in this form, thus retaining the shape of the cap and tending to permit desirable ventilation of the crown of the cap so that the cap will be comfortably cool. The members 6 may be bent to adjust the height of the rear portion and side portions of the crown of the cap and to maintain the rear and side portions of the crown of the cap in their proper shape.

In Figures 3 and 4, I show a front connector which may be made of light gauge flexible metal, such as aluminum, or any other suitable material and which is substantially arcuate in the longitudinal curvature and substantially U-shaped in transverse sectional curvature. The normally upper side of the member 10 is wider intermediate the length of the member 10 than the normally lower side of the member 10 as clearly shown in Figure 4. Each end portion of the member 10 is provided with two vertically spaced substantially horizontal openings such as indicated at 11 and 12, respectively and the end edges of the member 10 are formed to be substantially V-shaped as indicated at 13 in Figure 4. The member 10 may be used with the wires 1 and 4 in lieu of the tubular member 2, the ends of the member 1 being projected through the openings 11 and the ends of the member 4 being projected through the openings 12 into the groove of the member 10. The ends of the members 1 and 4 may protrude from the groove of the member 10 through the end notches 13 should the device be contracted in size until the lapped end portions of the wires 1 and 4 are longer than the member 10 with which they are associated.

It will be understood from the foregoing description that the member 10 would be placed in the crown of the cap with the wider side thereof uppermost when the member 10 is used in the device in lieu of the tubular member 2 and that the member 10 then would maintain the front portion of the crown of the cap in shape substantially in the manner of the tubular member 2.

Obviously, the invention is susceptible of embodiment in forms other than that which is illustrated in the accompanying drawings, and I therefore consider as my own all such modifications and adaptations thereof as fairly fall within the scope of the appended claims.

I claim:

1. A cap shape retainer comprising a pair of elongated flexible resilient members bent substantially to circular form, a longitudinally bowed tubular connector slidably receiving the end portions of both of said resilient members and maintaining said resilient members in circular form and permitting contraction of the frame so that it may be inserted within the cap and allow the frame to adjust itself to the walls of the cap, said connector being adapted to fit in the front portion of the crown of a cap and to maintain the front portion of the crown of the cap in shape, and flexible connectors between the portions of said resilient members which are located opposite to said first named connector, said flexible second named connectors maintaining the associated portions of the resilient members in spaced relation and cooperating with said resilient members to maintain the back and side portions of the crown of the cap in shape.

2. In a cap shape retainer, a frame comprising an upper spring wire member bent substantially to circular shape, a lower spring wire member also bent substantially to circular shape, a tubular member slidably receiving the ends of both of the frame members and permitting contraction of the same so that it may be inserted within the cap and allow the frame to adjust itself to the walls of the cap, and a plurality of flexible wires connecting the portions of said upper and lower spring wire members which are opposite to the said front connector.

3. In a cap shape retainer, a frame comprising an upper spring wire member bent substantially to circular shape, a lower spring wire member also bent substantially to circular shape, a front retaining member connecting and adjustably engaged with the end portions of said upper and lower spring wire members, and a plurality of flexible wires connecting the portions of said upper and lower spring wire members which are opposite to the said front connector, said front portion of the crown of the cap, said in the front portion of the crown of a cap and to maintain the rounded shape of said front portion of the crown of the cap, said rear connecting wires being curved outwardly intermediate said upper and lower spring wires to retain the back portion of the crown of the cap in shape.

4. In a cap shape retainer, a frame comprising an upper spring wire member bent substantially to circular shape, a lower spring wire member bent substantially to circular shape, a flexible tubular connector receiving and engaging with the end portions of said upper and lower spring wire members, and a plurality of wires connecting the portions of said upper and lower spring wires which are opposite to said tubular connector and maintaining said upper and lower spring wires in spaced relation, said tubular connector being adapted to fit in the front portion of the crown of a cap and to maintain the rounded form of said front portion of the crown of the cap and said rear connectors being bent outwardly along curved lines to cooperate with the adjacent portions of said upper and lower spring members to maintain the rear and side portions of the crown of the cap in shape.

5. In a cap shape retainer, a frame comprising an upper spring wire member bent substantially to circular shape, a lower spring wire member bent substantially to circular shape, a flexible tubular connector receiving and engaging with the end portions of said upper and lower spring wire members, and a plurality of wires connecting the portions of said upper and lower spring wires which are opposite to said tubular connector and maintaining said upper and lower spring wires in spaced relation, said tubular connector being adapted to fit in the front portion of the crown of a cap and to maintain the rounded form of said front portion of the crown of the cap and said rear connector being bent outwardly along curved lines to cooperate with the adjacent portions of said upper and lower spring members to maintain the rear and side portions of the crown of the cap in shape, the extremities of said spring wire members being enlarged and rounded to adapt them to be projected readily through said tubular connector.

ROBERT P. NIXON.